Jan. 30, 1968  M. GOETZL  3,366,852
PRESSURIZED VARIABLE CAPACITOR
Filed Oct. 13, 1965  2 Sheets-Sheet 1

INVENTOR:
MANLIO GOETZL
BY
Breitenfeld & Levine
ATTORNEYS

Jan. 30, 1968

M. GOETZL 3,366,852

PRESSURIZED VARIABLE CAPACITOR

Filed Oct. 13, 1965

INVENTOR.
MANLIO GOETZL

BY
Breitenfeld & Levine
ATTORNEYS

United States Patent Office 3,366,852
Patented Jan. 30, 1968

3,366,852
PRESSURIZED VARIABLE CAPACITOR
Manlio Goetzl, Yonkers, N.Y., assignor to Energy Laboratories, Inc., Yonkers, N.Y., a corporation of New York
Filed Oct. 13, 1965, Ser. No. 495,386
32 Claims. (Cl. 317—245)

This invention relates generally to devices employing pressurized vessels, and has particular reference to gastight housings of substantially cylindrical type in which opposite end caps are mounted on an intermediate cylindrical section.

Illustrative of such housings are those employed in certain electrical devices, such as fixed or variable capacitors, in which electrodes or similar elements are arranged in spaced relation with a gas under pressure therebetween. In a more specific sense, therefore, the invention relates to electrical devices of this character.

The terms "pressure" and "pressurized" as used herein and in the appended claims are intended to signify any pressure higher than the ambient pressure.

One of the objects of the invention is to provide a structure whose hermetic tightness can be more assuredly preserved, despite the difference of the coefficient of thermal expansion between the parts of which the housing is formed, and despite any tendency of the internal pressure to separate the parts.

Another object is to provide an improved means for mechanically controlling, from the exterior, desired movements of an element wholly enclosed within the housing. Such an element might be, for example, an electrode of a variable capacitor or an analogous part of some other type of electrical or non-electrical device. A more particular objective is to reduce the force imposed by the internal pressure upon such an externally actuated control.

An important further objective of the invention is to provide an improved structure by means of which spaced enclosed elements within the pressurized housing can be more assuredly maintained in precise spatial relation. In a capacitor, for example, in which a multiplicity of spaced plates or tubes defining one electrode are interleaved with those defining another electrode, it is highly important that the spacings be minute in magnitude yet accurately maintained. This invention aims to accomplish this despite possible misalignments or distortions of the housing sections.

A more particular object of the invention is to retain precise spacing in a device in which certain relative movements of enclosed electrodes or other elements are to be brought about by an externally located actuator. In a variable capacitor, for example, interleaved electrode parts must be controllably movable with respect to each other in longitudinal or axial direction while still maintaining precise spatial relationships in a transverse direction. This invention provides for the achievement of this result by special mounting, guiding, and actuating instrumentalities.

Another object of the invention is to improve the electrical relationship of the end caps of the pressurized housing when it is part of an electrical device in which these end caps are composed of conductive metal and define opposite electric terminals.

A general objective is to immunize a housing of the type described, and the fixed or relatively movable parts enclosed within it, from the deleterious effects of displacements and misalignments that might exist as a result of defects or irregularities in manufacture or assembly, or that might occur, in use, as a result of pressure differentials or differences in temperature coefficients of expansion.

Another object is to assemble the parts of the housing in such a way that secure mechanical joints exist between them, while hermetic tightness at the joints is maintained even though differences in thermal coefficients of expansion may be present. It is a feature of the invention to achieve the hermetically tight condition by a relatively thin and ductile metallic structure, while the mechanical firmness is maintained by a relatively heavy metallic structure having no appreciable ductility.

Another general object of the invention is to provide a structural arrangement of parts that is thoroughly practicable and economically sound from a manufacturing standpoint, staunch and wear resistant under prolonged and rugged use conditions, and reliable in operation and in maintenance of those precise relationships with which the invention is directly concerned.

Among the features of the invention, contributing to its effectiveness, are the arrangement of housing parts whereby the metal end caps are joined to the insulating medial section on the inside of the latter, the employment of special ductile metallic foil sleeves to insure hermetic tightness in the regions of the annular joints between the housing sections, the provision of a special supporting structure on the interior of the housing whereby the enclosed precisely spaced elements are both supported upon the same end cap, the provision of means for allowing precise relative movements between elements so supported, the provision of interior spring means for counteracting the pressure of the confined gas upon the external actuator, the provision of a flexible transmission between the actuator and the enclosed element whose movements are to be controlled, and the design and arrangement of component parts that shield the delicate spacial relationships from the possibly injurious effects of play, displacements and deviations between structural parts intended in theory to remain rigid and dimensionally precise.

Several ways of achieving these objects, and such other objectives and advantages as may hereinafter be pointed out, are illustrated in the accompanying drawings, in which FIGURE 1 is a perspective view, from the exterior of an illustrative pressurized vessel defining the housing of a variable capacitor;

Figure 1:
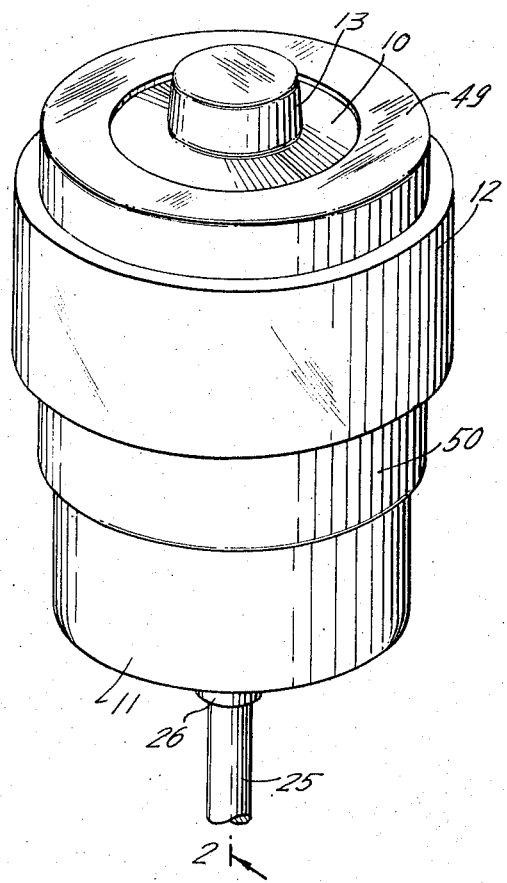

The pressurized device chosen for illustration is a variable capacitor each of whose electrodes is a series of concentric spaced tubes, the tubes of one electrode being interleaved with those of the other, and the electrodes being mounted for relative movement in an axial direction. Because the breakdown voltage is increased when the space between the electrodes is occupied by a gas under pressure, the entire electrode assembly is enclosed within a substantially cylindrical housing in which a gas under pressure, e.g., nitrogen, sulfur hexafluoride, or ordinary air, is confined. Capacitors of this general type are commonly employed as components of circuitry relating to radio and radar transmitters, induction machines for various industrial applications, filters, antenna couplers, voltage dividers, and the like.

The housing is composed of conductive metal end caps 10 and 11 and an intermediate cylindrical section 12 of insulating material such as relatively thick ceramic. The housing may embody any appropriate dimensions, and by way of example the housing illustrated may have an overall diameter of, say, two to six inches or more.

The end cap 10 has a closed end or neck 13 of reduced diameter, interiorly threaded to engage with and rigidly support a metallic disc or plate 14 on which a series of electrode tubes 15 are mounted. These tubes are concentric with one another and with the axis of the housing. Nine tubes have been shown, but they may be more or less in number, depending upon requirements. They may have a thickness of the order of .04 inch each.

Interleaved with the tubular electrode plates 15 is a similar series 16 mounted on a disc-like carrier 17. This series of plates is precisely fitted into the spaces between the plates 15 (the clearance being, e.g., of the order of .03 inch) and this spatial relation must be maintained during reciprocatory movements of the carrier 17 and tubes 16 in an axial direction. To serve as a reliable and accurate guidance for this movement, the carrier 17 is provided with a cylindrical sleeve 18 coaxial with the housing axis and slidably engaging a fixed tubular guide 20. The latter is secured to an insulating element 21 (composed for example of ceramic) by means of a flange 22 on the guide 20 and a fastener 23 screwed into the inner end of the element 21. At its outer end the element is similarly secured, as by a fastener 24, to the plate 14.

As a result of this arrangement, the two sets of interleaved electrode tubes are both supported by the same end cap 10, one being rigidly and immovably held, the other being supported for precise axial movement.

The rod-like actuator 25 by means of which the enclosed movable electrode structure is reciprocated projects axially from the opposite end cap 11. For this purpose, the cap 11 is provided with an open neck, as shown. It carries a tubular guide 26 for the actuator 25 and an adjacent thrust bearing 27 against which a flange 28 on the member 25 rests.

The actuator 25 has been shown in the form of a rod or shaft intended to be rotated and provided at its inner end with external screw-threads 29. These engage with internal screw-threads 30 on a cylindrical element 31 mounted for axial movement only and operatively connected to the movable electrode of the capacitor.

Because the actuator 25 is journaled in the cap 11, with its flange 28 pressed against the thrust bearing 27 by the internal pressure, it partakes of any misalignment of the end cap 11 relative to the cap 10. For this reason it is very important that the transmission between the actuator 25 and the movable electrode is flexible, i.e., that it be provided along its course with some type of flexible coupling that allows both angular and lateral displacements of the transmission axis on opposite sides of the coupling. For example, in the device illustrated in FIGURES 1–5, the cylinder 31 has a closed end 32 upon which a U-shaped yoke 33 is provided. Engaging with this yoke and arranged at right angles to it is a diametric cross-pin 34 carried by the inner end of the guiding sleeve 18. The pin 34 and yoke 33 are preferably of circular cross-section. (See FIGURES 3 and 4.) Thus the axes of the sleeve 18 and cylinder 31 may move out of alignment either angularly or laterally without disturbing the transmission of axial forces. In other words, an accurate maintenance of axial alignment between the actuator 25 and the axis of movement of the electrode is not critical and cannot affect the essential precision of axial movement of the electrode.

The end 32 of the cylinder is defined by a wall which extends radially beyond the cylinder 31 to define an overhang 39.

Figure 4:
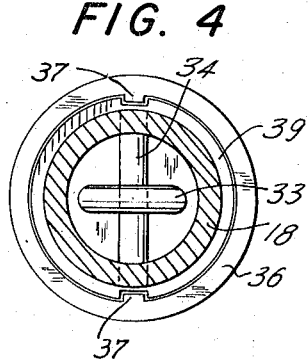
FIGURE 4 is a cross-sectional view along the line 4—4 of FIGURE 3.

Concentrically surrounding the cylindrical element 31 is a bellows seal 35 secured at its inner end to the overhang 39 and at its outer end to the end cap 11. Adjacent to the bellows is an axial guide with which the cylinder 31 cooperates to prevent rotative movement and to confine the cylinder 31 to axial movement. The guide has been shown in the form of a cylinder 36 provided with a longitudinally arranged keyway or rail 37 with which a notch 38 in the edge of the overhang 39 engages. There are preferably two diametrically opposed rails 37 as shown (FIGURE 4). Any guided interlock, equivalent to the rails shown, may be used.

The carrier 17 which supports the plates of the movable electrode is also provided with a sliding contact 40 adapted to press yieldably and resiliently against the inner surface of the end cap 11. The contact 40 may consist of a length or circlet of so-called "finger stock" which provides a multiple number of resilient contact fingers along the edge of a metallic strip. This strip can be secured in electrical contact with the conductive skirt 41 formed on or attached to the carrier 17.

The mechanical securement of the end caps 10 and 11 to the medial ceramic section 12 is accomplished by annular joints on the inside of the section 12. As shown, the end cap 10 has an out-turned flange 44 at its periphery, adapted to engage behind an annular rib 45 formed on the inside of section 12 adjacent to one end (see FIGURE 5). Similarly, the end cap 11 has a flange 42 engaging with a rib 43. The ribs 43 and 45 can be provided in the form of resilient split rings adapted, during assembly, to snap outwardly into appropriate annular grooves in the section 12.

Misalignment or displacement of these joints may occur from a variety of causes. For example, the difference between the temperature coefficient of expansion of the section 12 and that of the metal end caps may bring about a structural strain. In any case, any possible impairment of hermetic tightness is guarded against by the mounting of special relatively thin sleeves 46 and 47 of ductible metallic foil (e.g., silver) around the annular joints. The sleeve 46 is bonded to the interior edge of the section 12 on the external side of the joint formed by flange 44 and rib 45. The bonding may be achieved by preliminarily metallizing the edge of the section 12. The opposite end of the sleeve 46 is bonded to the raised annular bump 48 on the end cap 10. The ductile sleeve 47 is similarly mounted.

As a protection from abrasion or other injury, and to prevent rupture from the internal pressure on the thin metal sleeve, each ductile sleeve or metallic foil may be encircled by a frictionally held collar such as those indicated at 49 and 50. The outer ends of these collars may have inturned flanges as shown.

Figure 2:
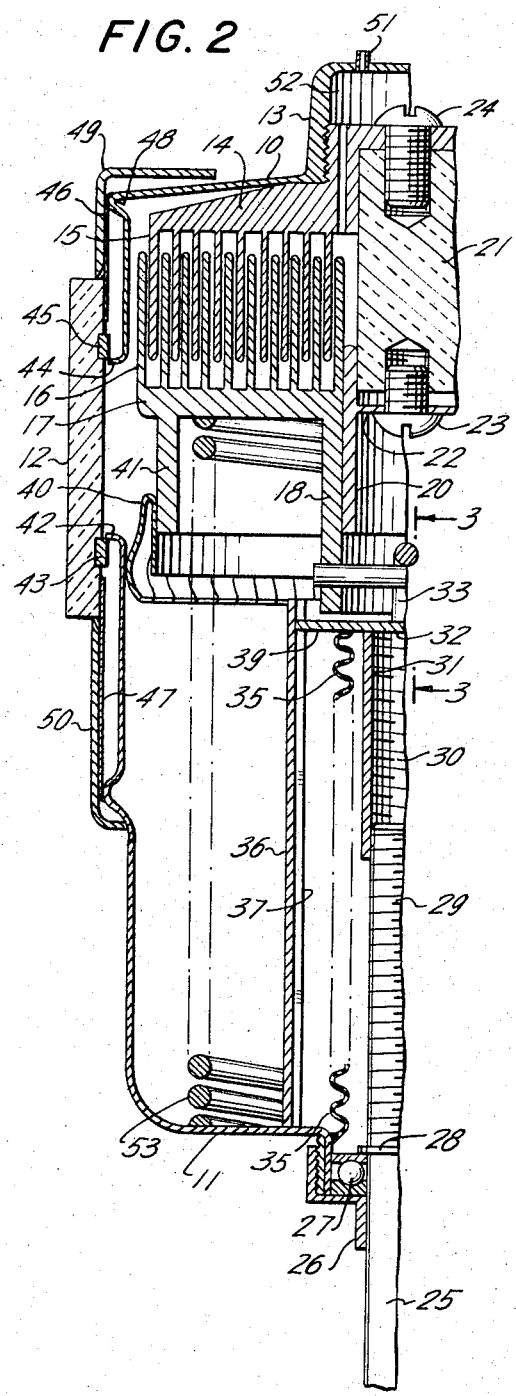
FIGURE 2 is a fragmentary longitudinal cross-section showing the internal arrangement of parts.
Figure 5:
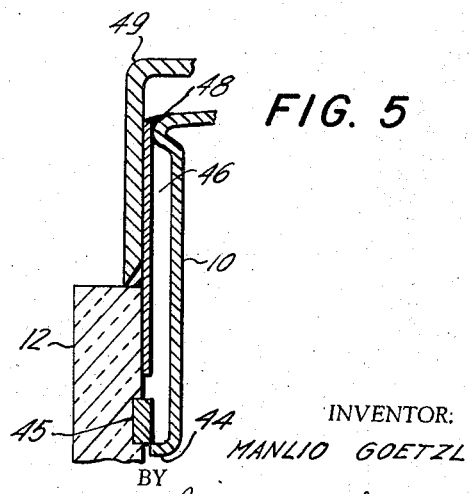
FIGURE 5 is an enlarged fragmentary detail of the upper part of the housing shown in FIGURE 2.
Figure 3:
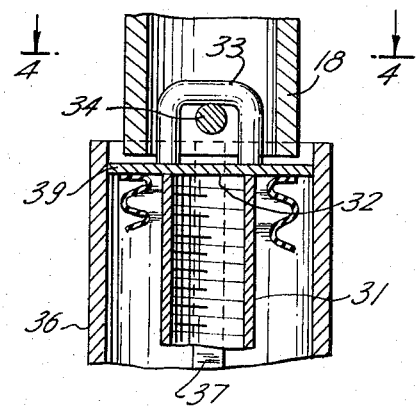
FIGURE 3 is an enlarged fragmentary view in the direction 3—3 of FIGURE 2.

The filling of the housing with the desired gas under pressure may take place through the temporary nipple 51 formed on the end cap 10 (FIGURE 2). After filling, the nipple is sealed off in any appropriate manner. To facilitate the entry of the gas into the interior regions, the attachment element 14 is preferably provided with at least one passage 52.

On the interior of the housing, operatively interposed between the end cap 11 and the carrier 17, is a compression spring 53. It counteracts the tendency of the gas to press the cylinder 31 in an outward direction. The strength of the spring 53 may be of any selected magnitude. To whatever extent it diminishes the outward pressure upon the cylinder 31 it reduces the load on the actuator that must be overcome during the axial movement of the electrode. If the strength of the spring 53 is sufficient, it may even be employed to overcome any tendency of the part 31 to be expelled, and in such a case an effect can be achieved which is similar to that which would occur if the internal pressure were less than that of the surrounding medium. This may be desirable under certain circumstances, e.g., if the objective is to retain the movable electrode or analogous element normally in a fully seated disposition.

Figure 7:
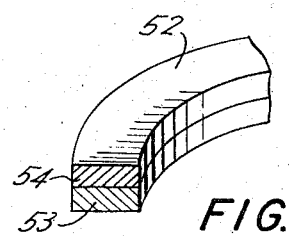
FIGURE 7 is an enlarged detail showing a modified spring.

In FIGURE 7 a modified spring is shown, of bimetallic character, i.e., it is composed of two helices 52 and 53 bonded together along the joint 54. By judicious selection of metals and dimensions, the strength of the spring can be maintained substantially equal to, or in a predetermined ratio to, the pressure which the spring is intended to counteract. If a temperature change alters the gas pressure, the spring pressure will be correspondingly altered.

Figure 6:
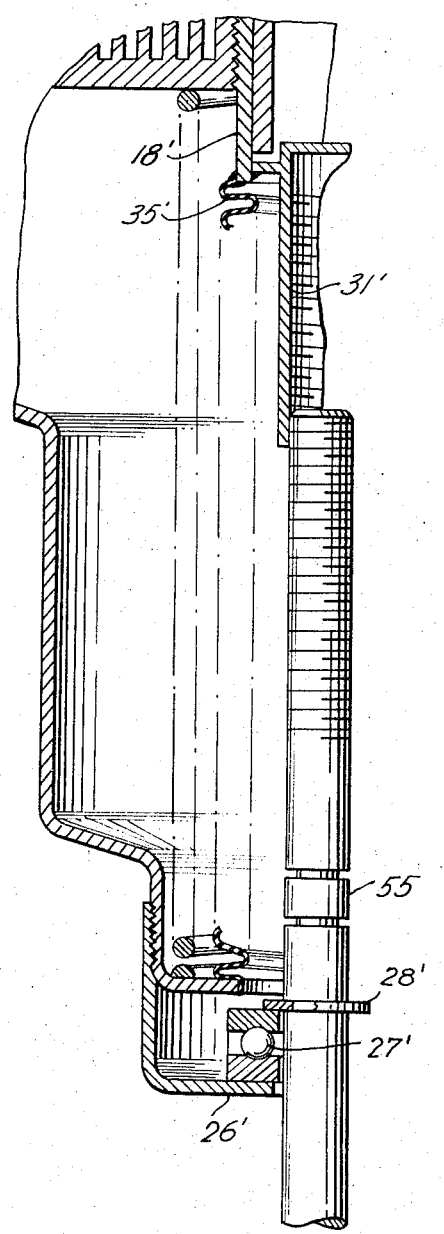
FIGURE 6 is a fragmentary view, similar to FIGURE 2, of a modification.

In FIGURE 6 a modification of the flexible transmission is depicted. In this case the sleeve 31' is secured directly to the guide 18' on the movable electrode. The desired flexibility is therefore imparted to the transmission on the exterior of the device, e.g., by flexible coupling 55 which may be of any selected commercially available type.

The transmission shown in FIGURES 1-5 is preferred since it more positively restricts the cylinder 31 to an axial non-rotative movement. The cylinder 31' is restrained only by the bellows seal 35'.

The external electrical connections are, of course, established in any desired or known way, at the opposite metallic end caps 10, 11 which serve as electrical terminals.

Because of the flexibility introduced into the transmission between the external actuator and the enclosed movable electrode or other element, and because the latter is supported and guided by structure secured to the end cap to which the fixed electrode is also attached, the device is effectively immunized against faulty or impaired operation caused by misalignments or undesired play between parts.

Electrically, also, the structure described is of an improved kind, because the direct air gap between the end caps is interrupted by the radially protruding medial section of insulating material. This protrusion is established by the special arrangement of the annular joints on the inside of the intermediate section. Heretofore, such an arrangement of parts has been considered undesirable and unfeasible.

The construction is of unusually low cost from a manufacturing standpoint. The section 12 can be a plain cylinder, the end caps simple spinnings. The parts associated with the end cap 10 can be preliminarily assembled with ease, and the final interlocking of the end caps into the ceramic section 12 is a quick procedure.

In general, it will be understood that changes in details and contours and dimensions can be made by those skilled in the art without necessarily departing from the spirit and scope of the invention as expressed in the appended claims.

What is claimed is:

1. In an electrical device, a gas-tight cylindrical housing comprising conductive metallic opposite end caps and an intermediate insulating section, precisely spaced electrodes within the housing electrically connected to said end caps respectively, means carried by one of said end caps for supporting both of said electrodes and a flexible coupling between the other of said end caps and its respective electrode, whereby the spacing between said electrodes is independent of the alignment of said end caps with respect to each other.

2. An electrical device as defined in claim 1, in which said insulating section has a temperature coefficient of expansion different from that of said end caps.

3. An electrical device as defined in claim 1, in which said electrodes are nested elements arranged with their axes parallel to the axis of the housing.

4. An electrical device as defined in claim 1, in which said electrodes are nested cylindrical tubes arranged concentric with the housing axis.

5. An electrical device as defined in claim 1, in which said supporting means comprises a conductive part secured directly to said one end cap and supporting the electrode with which said end cap is electrically connected, an insulator carried by said conductive part, and means carried by said insulator for supporting the other electrode.

6. In an electrical device, a gas-tight cylindrical housing comprising conductive metallic opposite end caps and an intermediate insulating section, precisely spaced electrodes within the housing electrically connected to said end caps respectively, one of said electrodes being a series of spaced tubes concentric with one another and with the housing axis, the other electrode being a similar series of concentric tubes interleaved with the first-named series, means carried by one of said end caps for supporting both of said electrodes and a flexible coupling between the other of said end caps and its respective electrode, whereby the lateral spacing between said interleaved tube series is independent of the alignment of said end caps with respect to each other.

7. An electrical device as defined in claim 6, in which said supporting means comprises a conductive part secured directly to said end cap and supporting the electrode with which said end cap is electrically connected, an insulator carried by said conductive part and extending axially and concentrically into the housing, and means carried by said insulator for supporting the other electrode.

8. In an electrical device, a gas-tight cylindrical housing comprising conductive metallic opposite end caps and an intermediate insulating section, relatively movable electrodes within the housing electrically connected to said end caps respectively, means carried by one of said end caps for immovably supporting one of said electrodes and supporting the other electrode for precisely guided reciprocation in an axial direction, and a flexible coupling between the other of said end caps and its respective electrode, whereby the lateral orientation of said electrodes with respect to each other is independent of the axial alignment of said end caps with respect to each other.

9. An electrical device as defined in claim 8, in which said supporting means is a conductive part secured directly to said end cap and supporting the immovable electrode, an insulator carried by said conductive part, and a guide element on the insulator for guiding the axial reciprocations of the movable electrode.

10. In an electrical device, a pressurized gas-tight cylindrical housing comprising conductive metallic opposite end caps and an intermediate insulating section, relatively movable electrodes within the housing electrically connected to said end caps respectively, means carried by one of said end caps for immovably supporting one of said electrodes and supporting the other electrode for precisely guided reciprocation in an axial direction, whereby the lateral orientation of said electrodes with respect to each other is independent of the axial alignment of said end caps with respect to each other, a movable actuator extending axially through the opposite end cap, and a flexible transmission between the actuator and the movable electrode.

11. An electrical device as defined in claim 10, in which said transmission includes an axially located screw-threaded element articulated to the electrode and mounted for axial movement only, and a complementary screw-threaded driving element mounted for rotative movement only.

12. An electrical device as defined in claim 11, the flexibility of the transmission being provided by a flexible coupling between said axially movable screw-threaded element and said electrode.

13. An electrical device as defined in claim 11, the flexibility of the transmission being provided by a flexible coupling between said actuator and said rotatively movable screw-threaded element.

14. In an electrical device, a pressurized gas-tight cylindrical housing comprising conductive metallic opposite end caps and an intermediate insulating section, relatively movable electrodes within the housing electrically connected to said end caps respectively, means carried by one of said end caps for immovably supporting one of said electrodes and supporting the other electrodes for precisely guided reciprocation in an axial direction, whereby the lateral orientation of said electrodes with respect to each other is independent of the axial alignment of said end caps with respect to each other, a movable actuator extending through the opposite end cap, a transmission between the actuator and the movable electrode, said transmission including an element mounted for axial movement and having one end operatively connected to said movable electrode, a bellows seal between said one end and said opposite end cap, and a compression spring within the housing interposed between said opposite end cap and the movable electrode to counteract the tendency of the gas within the housing to move said element outwardly.

15. In an electrical device, pressurized gas-tight cylindrical housing comprising conductive metallic opposite end caps and an intermediate insulating section, relatively movable electrodes within the housing electrically connected to said end caps respectively, means carried by one of said end caps for immovably supporting one of said electrodes and supporting the other electrode for precisely guided reciprocation in an axial direction, whereby the lateral orientation of said electrodes with respect to each other is independent of the axial alignment of said end caps with respect to each other, a movable actuator extending axially through the opposite end cap, a transmission between the actuator and the movable electrode, said transmission including an axially located cylindrical element mounted for axial movement and having a closed inner end connected to said electrode, a bellows seal between said inner end and the end cap through which the actuator extends, and a compression spring within the housing interposed between the latter end cap and the movable electrode to counteract the tendency of the gas within the housing to move said cylindrical element outwardly.

16. An electrical device as defined in claim 15, in which said cylindrical element is interiorly screw-threaded and cooperates with an exteriorly screw-threaded driving element connected to said actuator.

17. An electrical device as defined in claim 16, including an axially arranged guide adjacent to said bellows, and a cooperating guide part carried by the inner end of said cylindrical element, said guide and guide part allowing axial movement of said cylindrical element but preventing rotative movement thereof.

18. In a device of the character described, a pressurized gas-tight cylindrical housing, a wholly enclosed element mounted within said housing for controlled axial reciprocation, an actuator extending axially through an end wall of the housing, a transmission between said actuator and said enclosed element, including an axially located internally screw-threaded cylinder having a closed inner end articulated to said element, and a complementary externally screw-threaded driving element, said cylinder being mounted for axial movement only and said driving element being mounted for rotative movement only so that rotation of said driving element imparts axial movement to said enclosed element, a bellows seal surrounding said cylinder and extending between the closed inner end of the latter and said end wall, and a spring within the housing interposed between the housing and the enclosed movable element to counteract the gas pressure urging said cylinder outwardly, whereby the frictional drag between said screw-threaded parts is minimized.

19. A device of the character defined in claim 18, in which said spring is a compression spring concentric with and surrounding said bellows seal.

20. A device of the character defined in claim 18, in which said spring is a bimetallic helical compression spring concentric with and surrounding said bellows seal.

21. In a device of the character described, a pressurized gas-tight cylindrical housing comprising opposite end caps and an intermediate non-metallic cylindrical section, said end caps extending into said cylindrical section, annular joints connecting said caps to said intermediate section, and ductile metallic-foil sleeves surrounding said joints to insure hermetic tightness despite differences in temperature coefficients of expansion between the intermediate section and the end caps, each foil sleeve being bonded at one end to the interior surface of said intermediate section and at the other to the exterior surface of the adjacent end cap, whereby said foil sleeves are pressed against said cylindrical section by the gas pressure within the housing.

22. In a device of the character described, a pressurized gas-tight cylindrical housing comprising opposite end caps and an intermediate cylindrical section, said end caps extending into said cylindrical section, annular joints connecting said caps to said intermediate section, ductile metallic-foil sleeves surrounding said joints to insure hermetic tightness despite differences in temperature coefficients of expansion between the intermediate section and the end caps, each foil sleeve being bonded at one end to the interior surface of said intermediate section and at the other to the exterior surface of the adjacent end cap, and protective collars enclosing said foil sleeves respectively.

23. In a variable capacitor sealed within a housing containing a gas under pressure, a stationary head with electrode plates projecting therefrom, a movable head with oppositely projecting electrode plates, means for transmitting motion from the outside of the housing to said movable head while preserving said seal, said means extending partially into the housing and being thus subjected to the pressure of said gas, and a spring arranged to act upon said means in opposition to said pressure.

24. In a variable capacitor sealed within a housing containing a gas under pressure, a stationary head with electrode plates projecting therefrom, a movable head with oppositely projecting electrode plates, means for transmitting motion from the outside of the housing to said movable head while preserving said seal, and a flexible coupling serving as a connection between said means and said movable head.

25. A pressurized gas-tight cylindrical housing comprising opposite metallic end caps and an intermediate cylindrical section of insulating material, annular grooves on the inner surface of the intermediate section near its opposite ends, means carried by the end caps and engaging said grooves to establish a mechanical interlock between each end cap and said intermediate section, and a relatively pliable element at each end of said intermediate section extending between and bonded to said section and the adjacent end cap to establish a hermetic ductile seal around the corresponding mechanical interlock.

26. In a sealed variable capacitor, a housing comprising a tubular sleeve of insulating material and rigid metallic end caps, relatively movable electrodes within the housing, and means to transmit motion to said electrodes from the exterior of the housing while preserving the sealed condition of the housing; said sleeve being provided with recesses on its inner surface, said end caps extending into said sleeve and having out-turned flanges, and elastic elements sprung into said recesses to provide abutments against which said flanges bear to retain said end caps in mechanically interlocked relation to the opposite ends of said sleeve.

27. A capacitor as defined in claim 26, including a pliable ductile element interposed between each end cap and said sleeve to establish a hermetic seal on the outside of the interlock.

28. In a housing for a sealed capacitor of the character described, a cylindrical sleeve of insulating material having its opposite ends internally metallized, a pair of metallic end caps extending into said opposite ends, a thin ductile metallic element bonded to each metallized sleeve end and to the adjacent end cap to provide a hermetic seal, and means mechanically interengaging the enclosed ends of said caps to said sleeve.

29. In a housing for a sealed capacitor of the character described, a cylindrical sleeve of insulating material, a pair of metallic end caps extending into the opposite ends of said sleeve, a thin ductile element bonded to the inside of the opposite ends of said sleeve and to the adjacent end cap to provide a hermetic seal, and means mechanically interengaging the enclosed ends of said cap to said sleeve.

30. In an electrical device, a gas-tight cylindrical housing comprising conductive metallic opposite end caps and an intermediate insulating section, precisely spaced electrodes within the housing electrically connected to said end caps respectively, and means carried by one of said end caps serving as the sole support for both of said electrodes, said supporting means comprising a conductive part secured to said one end cap and supporting the electrode with which said end cap is electrically connected, an insulator carried by said conductive part, and low-friction means carried by said insulator for slidably supporting the other electrode.

31. In an electrical device, a gas-tight cylindrical housing comprising conductive metallic opposite end caps and an intermediate insulating section, relatively movable electrodes within the housing electrically connected to said end caps respectively, means carried by one of said end caps for immovably supporting one of said electrodes and serving as the sole support of the other electrode for precisely guided reciprocation in an axial direction, and means for maintaining a slidable electrical contact between said movable electrode and its respective end cap during relative movement between said electrodes.

32. In a pressurized housing for a sealed capacitor of the character described, a cylindrical sleeve of insulating material, a pair of metallic end caps extending into the opposite ends of said sleeve, means for hermetically sealing said ends caps to the opposite ends of said sleeve, and means within aid sleeve for mechanically interengaging the enclosed ends of said caps to said sleeve.

References Cited
UNITED STATES PATENTS

| | | | |
|---|---|---|---|
| 3,257,590 | 6/1966 | Hansen | 317—245 |
| 1,956,368 | 4/1934 | Wilde | 317—244 X |
| 2,057,452 | 10/1936 | Scott. | |
| 2,230,125 | 1/1941 | Usselman | 317—245 X |
| 2,380,774 | 7/1945 | Maitland | 317—251 X |
| 2,431,226 | 11/1947 | Berkey | 220—2.3 X |
| 3,003,603 | 10/1961 | Spurck | 220—2.3 X |
| 3,040,220 | 6/1962 | Neibaur | 317—245 |
| 3,242,397 | 3/1966 | Jennings | 317—245 |

DARRELL L. CLAY, *Primary Examiner.*

L. H. MYERS, *Examiner.*

E. GOLDBERG, *Assistant Examiner.*